US009309915B1

(12) United States Patent
Rodenhouse et al.

(10) Patent No.: US 9,309,915 B1
(45) Date of Patent: Apr. 12, 2016

(54) WASHER AND COMBINATION WASHER AND FASTENER SYSTEM FOR BUILDING CONSTRUCTION

(71) Applicant: Rodenhouse, Inc., Grand Rapids, MI (US)

(72) Inventors: Robert H. Rodenhouse, Grand Rapids, MI (US); Jason R. Wigboldy, Grand Rapids, MI (US); Mitch Zuverink, Byron Center, MI (US)

(73) Assignee: Rodenhouse, Inc., Grand Rapids, MI (US)

( * ) Notice: Subject to any disclaimer, the term of this patent is extended or adjusted under 35 U.S.C. 154(b) by 0 days.

(21) Appl. No.: 14/216,062

(22) Filed: Mar. 17, 2014

Related U.S. Application Data

(60) Provisional application No. 61/788,635, filed on Mar. 15, 2013.

(51) Int. Cl.
  *F16B 43/00* (2006.01)
  *B25C 7/00* (2006.01)

(52) U.S. Cl.
  CPC .. *F16B 43/00* (2013.01); *B25C 7/00* (2013.01)

(58) Field of Classification Search
  CPC .. F16B 2043/008; F16B 43/00; F16B 43/001; B25C 7/00; B25C 5/1693; E04D 5/143; E04D 5/145
  USPC ............... 52/741.1, 741.4, 410, 506.05, 511; 411/160, 162, 531; 279/145
  See application file for complete search history.

(56) References Cited

U.S. PATENT DOCUMENTS

| D32,793 S | 6/1900 | Fauber |
| 1,356,873 A * | 10/1920 | Monteath ............... F02D 1/00 277/653 |
| 3,069,919 A | 12/1962 | Schultz, Jr. |

(Continued)

FOREIGN PATENT DOCUMENTS

| CH | WO 2012143034 A1 * | 10/2012 | ............ E04D 3/3603 |
| DE | 102007026733 A1 * | 12/2008 | ............... E04D 3/36 |
| LI | DE 102011076967 A1 * | 12/2012 | .............. E04D 5/145 |

OTHER PUBLICATIONS

Brochure disclosing 2" diameter Plasti-Grip® PBLP2 washer distributed by Rodenhouse Inc. more than one year prior to Sep. 6, 2012.

(Continued)

*Primary Examiner* — Charles A Fox
*Assistant Examiner* — Joseph J Sadlon
(74) *Attorney, Agent, or Firm* — Gardner, Linn, Burkhart & Flory, LLP

(57) ABSTRACT

A washer for use in building construction has an outer side having a solid upper surface defined by an upper wall, an underside opposite the outer side, and a perimeter, with an aperture extending from the outer side to the underside. The washer further includes an engagement portion configured to be at least one of a projection member or a receptacle in the outer side and located inward of the perimeter, with the projection member extending upward from the upper surface and the receptacle extending inward from the upper surface. The engagement portion is configured for mating with an adapter of a fastener gun for locating the fastener gun relative to the aperture. The washer can additionally include one or more prong members projecting from the underside and disposed radially inward from the perimeter.

21 Claims, 18 Drawing Sheets

(56) References Cited

U.S. PATENT DOCUMENTS

| | | | |
|---|---|---|---|
| 4,102,239 A | 7/1978 | Dallas | |
| 4,114,597 A * | 9/1978 | Erb | 126/665 |
| 4,292,876 A | 10/1981 | De Graan | |
| 4,619,094 A * | 10/1986 | Yang | E04D 5/147 135/119 |
| 4,793,757 A | 12/1988 | Peterson | |
| 4,928,867 A * | 5/1990 | Jensen | B25C 7/00 227/130 |
| 4,959,938 A | 10/1990 | De Caro | |
| 5,079,055 A | 1/1992 | Doyle | |
| 5,407,313 A * | 4/1995 | Bruins | E04D 5/143 411/369 |
| 5,419,666 A | 5/1995 | Best | |
| 5,423,858 A | 6/1995 | Bolanos et al. | |
| 5,517,883 A | 5/1996 | Goldi et al. | |
| 5,541,377 A | 7/1996 | Stuhlmacher | |
| 5,803,693 A * | 9/1998 | Choiniere et al. | 411/537 |
| 5,833,422 A | 11/1998 | Haga et al. | |
| D410,869 S | 6/1999 | Singer | |
| 5,907,938 A * | 6/1999 | Sheahan | E04D 3/3603 411/531 |
| 5,947,362 A * | 9/1999 | Omli | B25C 5/1693 227/120 |
| 6,039,525 A | 3/2000 | Johnson | |
| 6,231,063 B1 | 5/2001 | Chi | |
| D482,270 S | 11/2003 | Derilo | |
| 6,665,991 B2 * | 12/2003 | Hasan | 52/410 |
| 7,090,455 B2 * | 8/2006 | Lamb | 411/531 |
| D549,091 S | 8/2007 | McIntyre et al. | |
| 7,415,803 B2 * | 8/2008 | Bronner | 52/378 |
| D576,480 S | 9/2008 | Vakiener et al. | |
| D596,934 S | 7/2009 | Vakiener et al. | |
| D634,248 S | 3/2011 | Chen | |
| 7,896,380 B2 | 3/2011 | Tange | |
| D644,921 S | 9/2011 | Hsu et al. | |
| D645,337 S | 9/2011 | Hsu et al. | |
| D660,691 S | 5/2012 | Yamazaki | |
| D663,243 S | 7/2012 | Li | |
| 8,336,275 B2 | 12/2012 | Rodenhouse | |
| D679,169 S | 4/2013 | Else | |
| D679,572 S | 4/2013 | Attaway | |
| 8,413,740 B2 * | 4/2013 | Rodenhouse | 173/29 |
| D682,666 S | 5/2013 | Wigboldy | |
| D696,930 S | 1/2014 | Rodenhouse et al. | |
| D696,931 S | 1/2014 | Rodenhouse et al. | |
| D696,932 S | 1/2014 | Rodenhouse et al. | |
| 8,883,059 B2 * | 11/2014 | Lewis | F16B 5/065 264/250 |
| 2004/0060723 A1 | 4/2004 | Pallapothu | |
| 2004/0084099 A1 | 5/2004 | Miura | |
| 2006/0171794 A1 | 8/2006 | Ordonio, Jr. et al. | |
| 2008/0310932 A1 | 12/2008 | McIntyre et al. | |
| 2010/0019014 A1 * | 1/2010 | Rodenhouse | 227/32 |

OTHER PUBLICATIONS

Brochure disclosing 1-3/4" diameter Plasti-Grip® CBW washer distributed by Rodenhouse Inc. more than one year prior to Sep. 6, 2012.

Brochure disclosing 1-1/4" diameter Grip-Plate® Tab washer distributed by Rodenhouse Inc. more than one year prior to Sep. 6, 2012.

Brochure disclosing 1-1/4" diameter Grip-Plate® Plastic washer distributed by Rodenhouse Inc. more than one year prior to Sep. 6, 2012.

Brochure disclosing 2" diameter Plasti-Grip® CBW2 washer distributed by Rodenhouse Inc. more than one year prior to Sep. 6, 2012.

Brochure disclosing 1-3/4" diameter Plasti-Grip® III washer distributed by Rodenhouse Inc. more than one year prior to Sep. 6, 2012.

Brochure disclosing Plasti-Grip® PMF Plastic Masonry Fastener distributed by Rodenhouse Inc. more than one year prior to Sep. 6, 2012.

Brochure disclosing 3" diameter Grip-Lok® "Hurricane" washer distributed by Rodenhouse Inc. more than one year prior to Sep. 6, 2012.

* cited by examiner

WASHER AND COMBINATION WASHER AND FASTENER SYSTEM FOR BUILDING CONSTRUCTION

CROSS REFERENCE TO RELATED APPLICATION

The present application claims priority of U.S. provisional application Ser. No. 61/788,635 filed Mar. 15, 2013, which is hereby incorporated herein by reference it its entirety.

BACKGROUND OF THE INVENTION

The present invention is directed to combinations of washers and fasteners for use in building construction, as well as fastener systems including fastener gun mounted adapters for engaging with a washer during construction.

Fasteners and are used to secure exterior wall systems, such as wall systems in which inner wall members comprising barrier sheets are affixed over pliable building materials and secured to a rigid support. In particular building constructions fasteners referred to as brick ties are used that include wire tie members that are embedded into mortar used in constructing an outer wall. The securing of fasteners into and through the inner wall members has the potential to create leak paths for moisture, which can cause significant damage.

SUMMARY OF THE INVENTION

The present invention provides a washer and fastener combination that is well suited for retaining barrier sheets against walls.

According to an aspect of the present invention, a washer for use in building construction comprises an outer side having a solid upper surface defined by an upper wall, an underside opposite the outer side, and a perimeter. An aperture extends from the outer side to the underside. The washer further includes an engagement portion configured to be at least one of a projection member or a receptacle in the outer side and located inward of the perimeter, with a projection member extending upward from the upper surface and a receptacle extending inward from the upper surface. The engagement portion is configured for mating with an adapter of a fastener gun for locating the fastener gun relative to the aperture.

In particular embodiments the washer includes one or more prong members projecting from the underside, with the prong members being disposed radially inward from the perimeter. The underside additionally includes an outer sealing surface adjacent to and disposed about the perimeter and an inner sealing surface disposed about an opening in the underside formed by the aperture, with the prong members being disposed radially between the outer and inner sealing surfaces. Still further, the washer includes a chamfer disposed about the aperture at the outer or upper side of the washer where the underside of a screw head of a screw used to affix the washer to a building wall engages with the chamfer surface to create a seal there between.

In a particular embodiment in which the engagement portion comprises a projection member, a wall portion is included that is upwardly angled relative to the upper wall of the washer, where the wall portion may comprise a circumferential wall and the washer may include a generally planar top surface with the aperture forming an opening in the top surface.

An adapter configured for use with the washer to comprise a washer and adapter system is configured for mating engagement with the engagement portion of the washer for locating an aperture of the adapter relative to the corresponding washer aperture. The adapter includes a receptacle having a correspondingly angled inner wall that mates with the wall portion of the projection member, with the adapter including an arm that is removably attachable to the fastener gun.

A method of affixing a washer to a building wall in accordance with another aspect of the invention comprises providing a washer including prongs, and pressing the prongs into a soft building material of the building wall whereby the washer is self-retained on the soft building material. The method further includes providing an adapter affixed to a fastener gun, with the adapter having an adapter surface for mating with the washer, and engaging the adapter surface with an engagement portion of the washer, wherein when the adapter surface is engaged with the engagement portion an aperture in the washer is axially aligned with an aperture in the adapter such that a fastener can be driven from the fastener gun into the washer aperture with the fastener fixedly holding the washer to the building wall.

The washer and fastener combinations enable soft or pliable building materials, such as barrier sheets and insulation, to be rapidly, accurately and safely mounted to buildings. The washers via the prongs can be pre-spotted by hand, that is, they can be manually pressed into a building surface where desired. Subsequently, via the use of a self-centering tool affixed to a fastener gun, fasteners, such as screws, can be driven through the washers to securely affix the washers to the building. Moreover, because the washers are able to be placed on the building material and be self-retained via the prongs, an operator or construction worker does not have to place their hand in front of the fastener gun to hold or insert the washer. Still further, the inclusion of sealing surfaces on the underside of the washer, and the inclusion of a sealing surface in the form of a chamfer about the aperture in the top side of the washer, inhibits water, moisture and air from getting past the undersurface of the washer or into the aperture and to the point at which the fastener penetrates the building materials. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
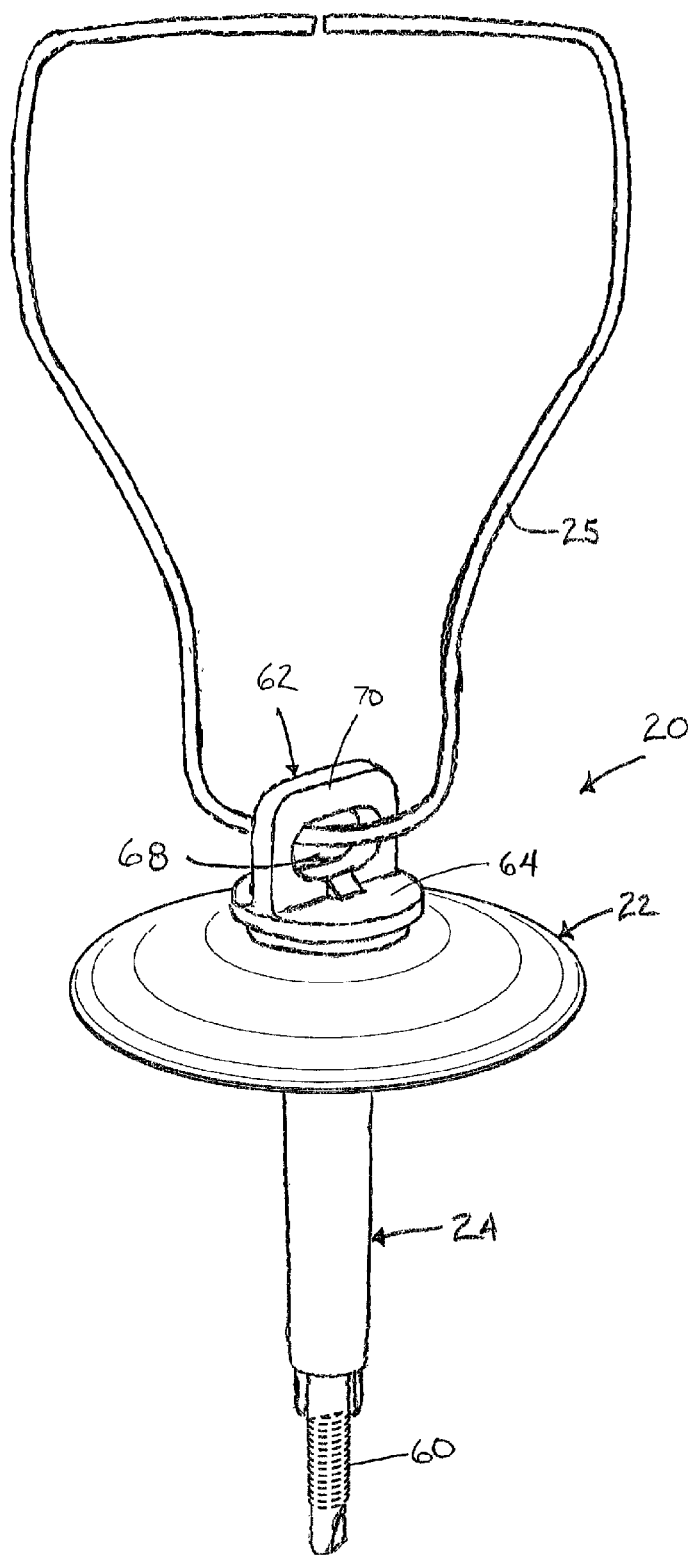
FIG. 1 is a perspective view of a washer and fastener according to an aspect of the present invention, where the fastener comprises a brick-tie.
Figure 1A:
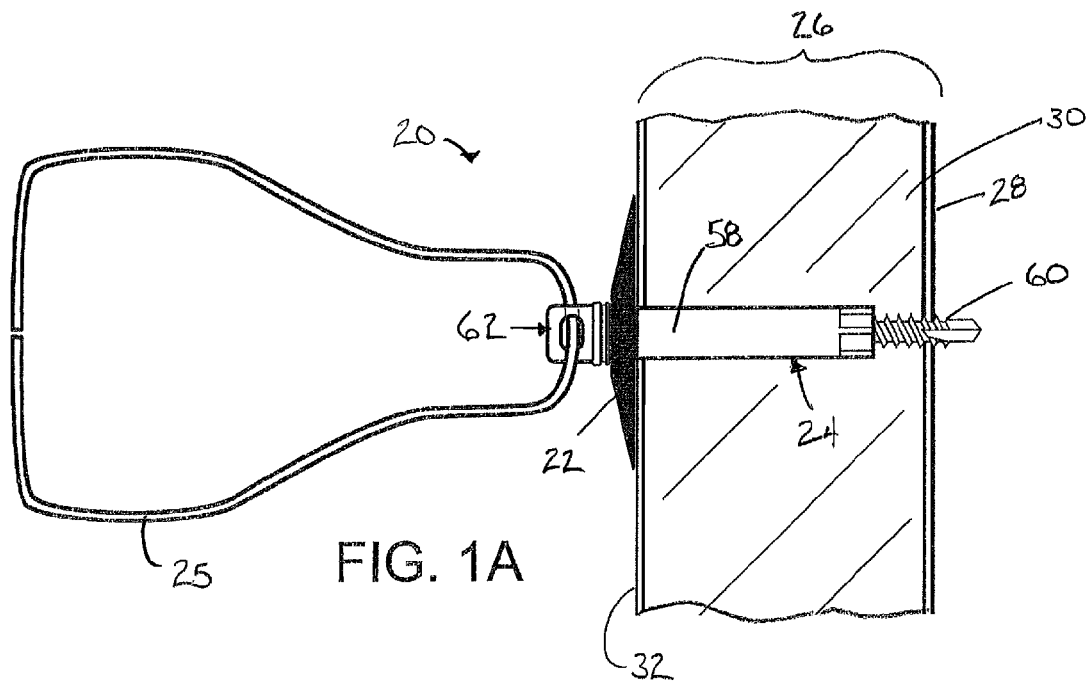
FIG. 1A is a side elevation view of the washer and fastener of FIG. 1 shown in use on a portion of a building wall.
Figure 1B:
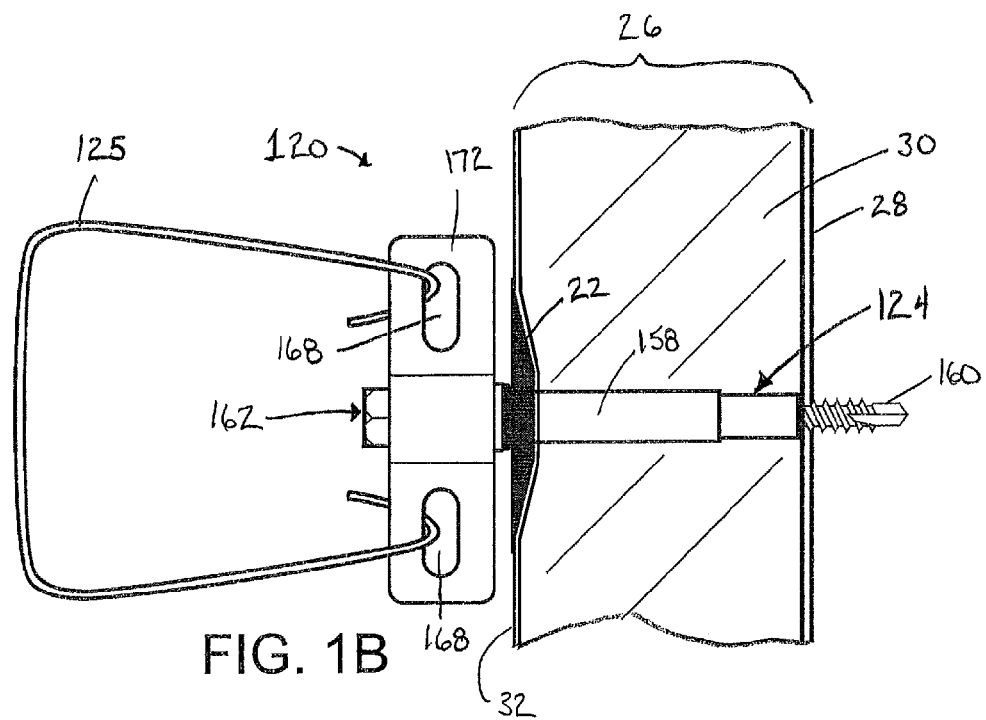
FIG. 1B is a side elevation view of a washer and fastener according to an aspect of the present invention shown in use on a portion of a building wall, where the fastener comprises an alternative brick-tie relative to that shown in FIGS. 1 and 1A.

FIG. 1 discloses a washer and fastener combination 20, which is shown in FIG. 1A mounted to an inner wall system 26, where combination 20 includes washer 22 and fastener 24. Wall 26 includes a rigid portion 28, which in the embodiment shown comprises a steel framing member, includes a soft, pliable or penetrable building material portion 30, which in the embodiment shown comprises a foam insulation portion, and a barrier sheet 32 disposed over insulation portion 30. As discussed below, washer 22 operates to retain sheet 32 in place, as well as seal against moisture and/or air penetrating past washer 22 through wall 26 along fastener 24 toward rigid portion 28, such as either through the opening in washer 22 receiving fastener 24, or beneath washer 22 between washer 22 and sheet 32. In the embodiment of FIG. 1A, fastener 24 is not fully seated against rigid portion 30. With reference to FIG. 1B, which discloses washer 22 with an alternative fastener 124 to comprise washer and fastener combination 120, the fastener 124 is seated against rigid portion 28. As shown, washer 22 is flexible whereby it may deflect relative to insulation 30 to maintain and promote sealing. Fasteners 24 and 124 comprise conventional brick-ties or veneer anchors that are used in retaining an outer wall, such as a brick wall or stone wall (not shown), to wall 26, where tie members 25 and 125, respectfully, formed as wires may be secured to the outer wall, such as within mortar used in constructing the outer wall.

Figure 2:
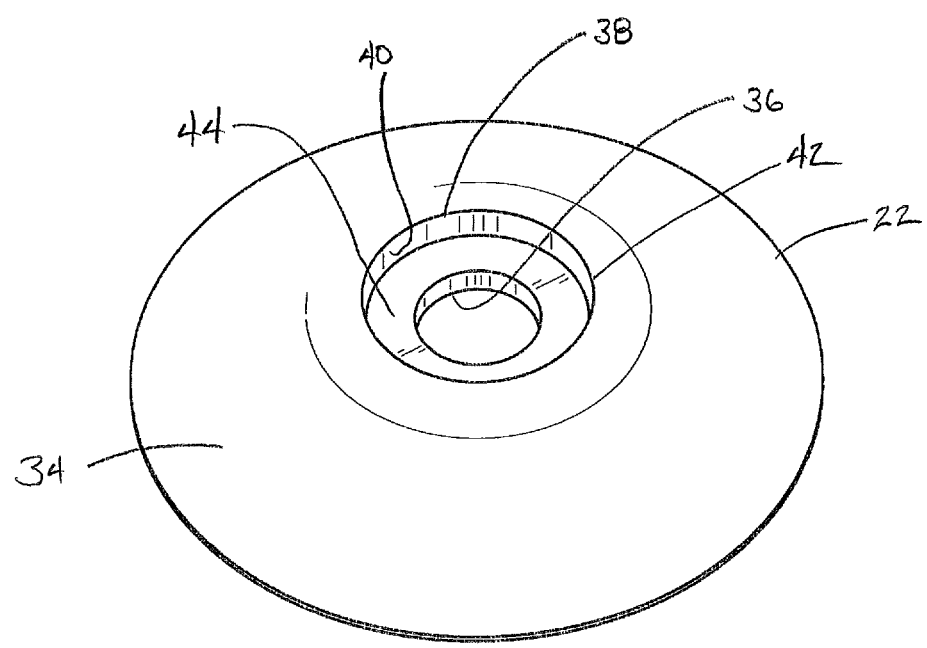
FIG. 2 is a top perspective view of the washer of FIGS. 1A and 1B shown removed from the fastener.
Figure 3:
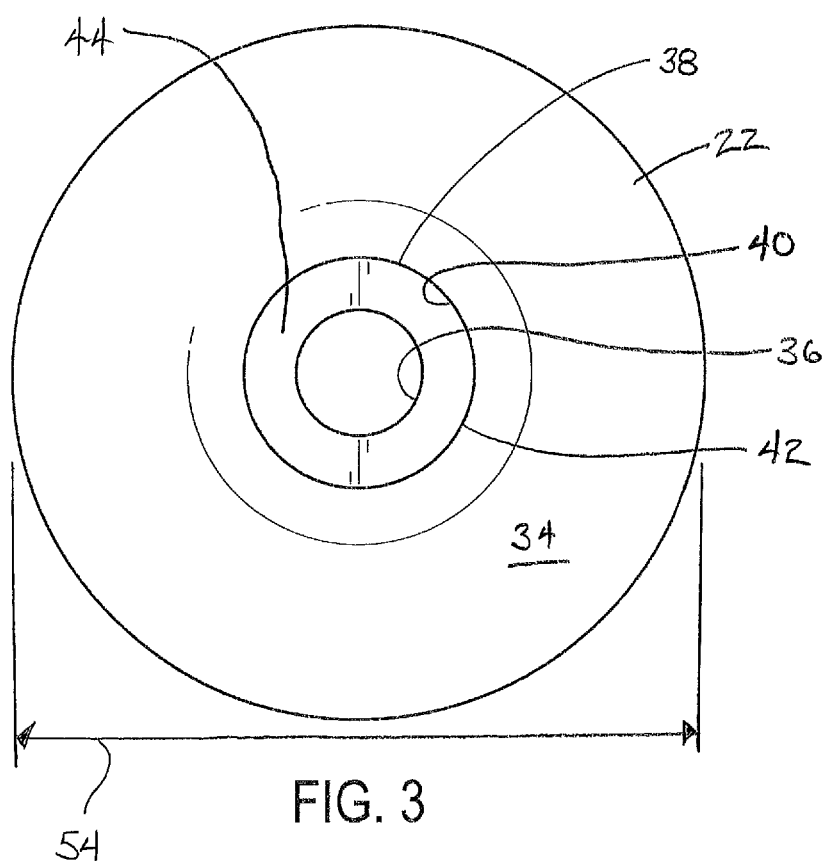
FIG. 3 is a top plan view of the washer of FIG. 2.
Figure 4:
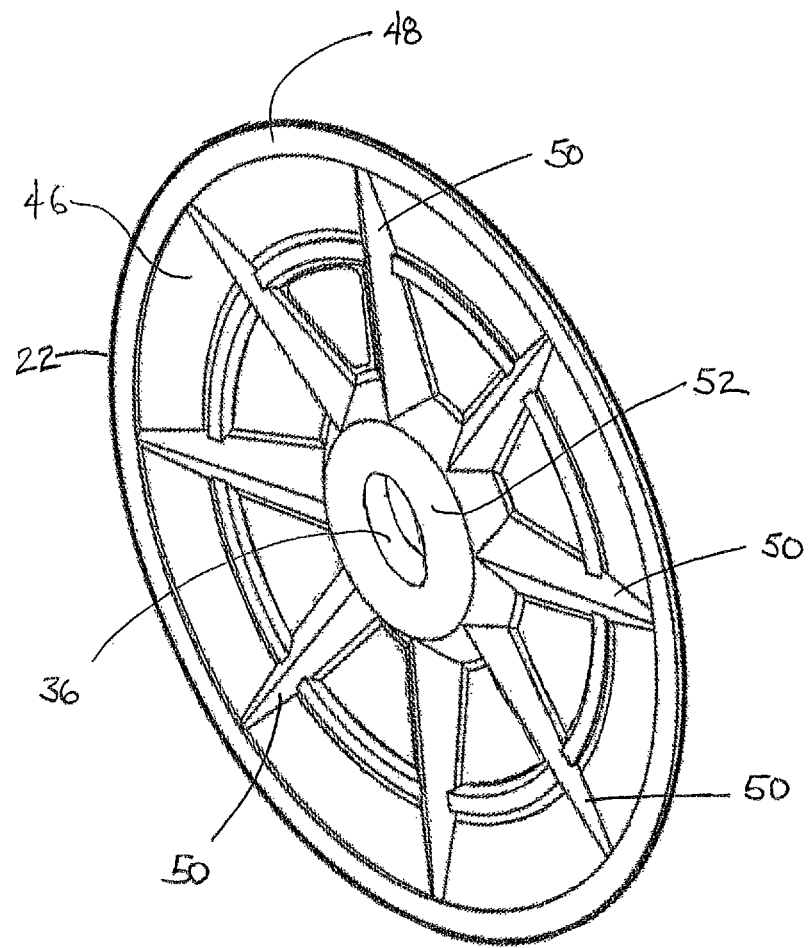
FIG. 4 is a bottom perspective view of the washer of FIG. 2.

With reference to FIGS. 2-4, washer 22 is plastic and is shown to include a solid upper or outer surface or upper or outer wall 34, a central aperture 36 extending through washer 22, and a recess or cavity 38 in outer surface 34. Cavity 38 includes a wall 40 formed as a cylindrical bore that forms an opening 42 in outer surface 34, where the cylindrical bore 40 has a diameter greater than aperture 36 and does not extend through washer 22 such that it thereby forms a seat 44. Washer 22 includes an underside or backside 46 having an outer circumferential sealing surface 48, a plurality of ribs 50, and a central bottom surface 52 disposed about aperture 36. Underside 46 is generally concave, with outer surface 34 being correspondingly generally conical. The concavity of underside 46 (FIG. 4) is defined in part by the recessing of bottom surface 52 relative to sealing surface 48. That is, bottom surface 52 is recessed away from a plane defined by sealing surface 48. Thus, for example with reference to FIG. 1A, with washer 22 disposed against a wall 26 prior to fastener 24 being fully tightened such that washer 22 is not flexed and sealing surface 48 is against sheet 32, bottom surface 52 would be slightly elevated from sheet 32. Upon tightening fastener 24, however, washer 22 may flex such that bottom surface 52 contacts wall 26.

In the embodiment shown, washer 22 has an outside diameter 54 (FIG. 2) of approximately two inches and aperture 36 has a diameter of approximately 0.4 inches. Bore 40 defines a diameter of approximately 0.6 inches with a depth of approximately 0.08 inches to define seat 44. It should be appreciated, however, that alternatively shaped and sized washers may be employed. For example such an alternative washer may have an outside diameter ranging between approximately 2 to 3 inches and a central aperture ranging between approximately 0.38 to 0.43 inches. Still further, the cavity defining bore may have a diameter ranging between approximately 0.7 to 0.8 inches and a seat defining depth of approximately 0.07 to 0.09 inches. Although washer 22 is disclosed as being circular, it should be appreciated that alternative shapes and configurations may be employed, including with regard to the underside of washer 22. Still further, although outer circumferential sealing surface 48 is shown disposed at the outer peripheral circumferential edge of washer 222, it should be understood that an outer sealing surface may be disposed inwards of the outer peripheral circumferential edge and still comprise an outer sealing surface relative to aperture 36.

Figure 5A:
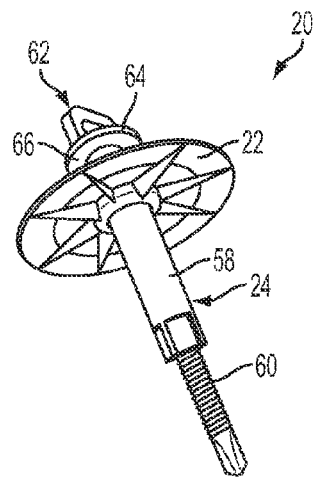
FIG. 5A discloses a bottom perspective view of the washer and fastener of FIG. 1.
Figure 5B:
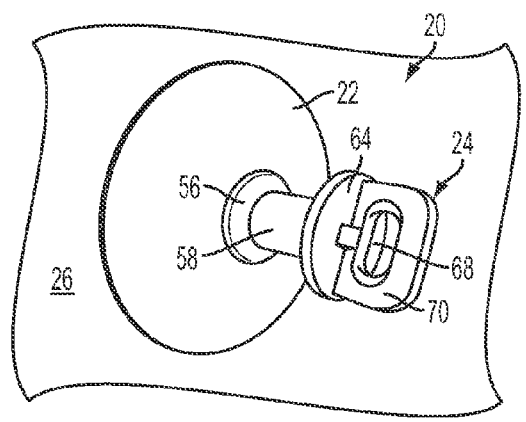
FIG. 5B discloses the washer and fastener of FIG. 5A shown partially mounted to a wall.
Figure 5C:
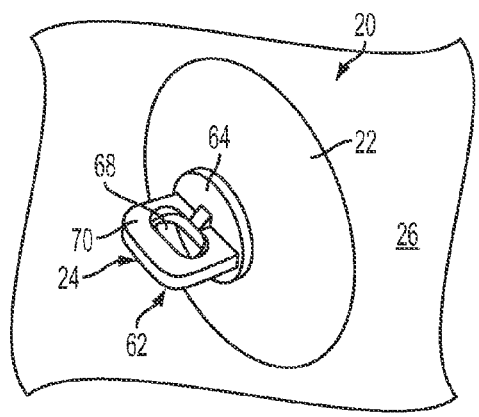
FIG. 5C discloses the washer and fastener of FIG. 5A with the fastener fully driven into the wall.

Referring now to FIGS. 5A-5C, combination 20 is shown with washer 22 assembled to fastener 24, where fastener 24 is supplied by Heckman Building Products, Inc. In addition a seal ring 56 is included, where seal ring 56 comprises an o-ring and is configured to be received within cavity 38 of washer 22. Fastener 24 includes a smooth barrel or shaft 58 of approximately ⅜ inch diameter, a threaded end 60 and a head 62. Head 62 includes a flange 64 with a seal surface 66 that is generally perpendicular to the longitudinal axis of shaft 58. Head 62 further includes an aperture 68 in a driver portion 70, where aperture 68 is configured for receiving a tie member, such as tie member 25 (FIG. 1A), and driver portion 70 may be engaged by a chuck of a fastener gun to secure fastener 24 to a wall.

As shown, seal ring 56 is placed over shaft 58 with shaft 58 then being passed through aperture 36 of washer whereby seal ring 56 is retained within cavity 38. Combination 20 is then assembled to a wall 26 by threading end 60 into the wall whereby surface 66 of head 62 is driven into engagement with seal ring 56 to contact and thereby compress seal ring 56 prior to surface 66 contacting washer 22 about opening 42. In such case, seal ring 56 is compressed against wall 40 and seat 44 of cavity 38, as well as against shaft 58 and surface 66 of fastener 24. Appropriate tightening of fastener 24 thus results in the creation of a seal between washer 22 and a barrier sheet 22 via sealing surface 48 of washer 22, as well as provides sealing between washer 22 and fastener 24 via seal ring 56. Combination 20 thereby provides sealing against moisture and air. In addition, the larger outer diameter of washer 22 relative to head 62 of fastener 24 provides retention of barrier sheet 32 to wall 26. That is, during construction the assembled combination 20 inhibits barrier sheet 32, which may comprise a thin plastic film, from ripping or pulling away. For example, prior to the assembly of the outer wall, wall portion 26 will be exposed to weather, such as wind and rain. Combination 20 thereby seals against wall 26 and retains barrier sheet 32 whereby separate barrier sheet retention fasteners and washers are not required.

Figure 6A:
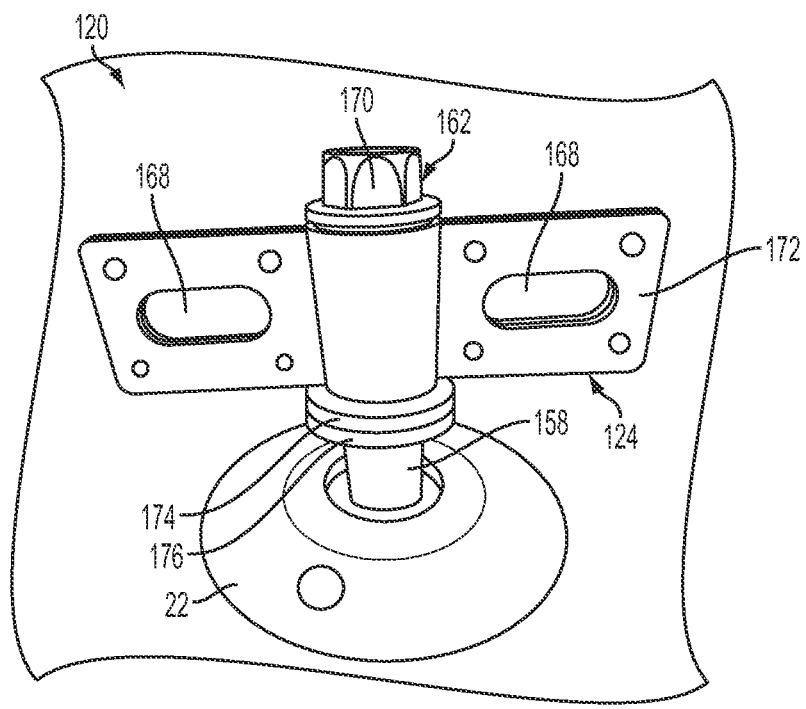
FIG. 6A discloses the washer and fastener of FIG. 1B shown partially mounted to a wall.
Figure 6B:
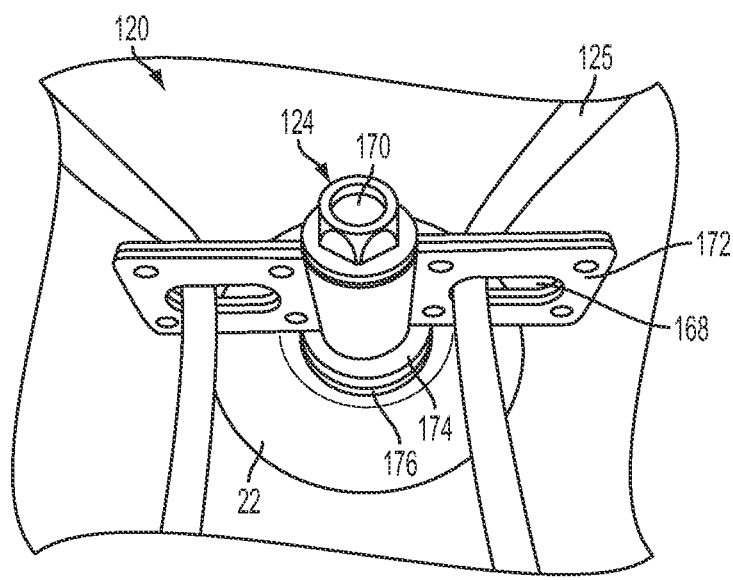
FIG. 6B discloses the washer and fastener of FIG. 6A, with the fastener fully driven into a wall and a tie member joined with the collar of the fastener.

Referring now to FIGS. 6A and 6B, combination 120 is shown mounted, where combination 120 includes washer 22 and fastener 124. Fastener 124 is provided by Hohmann & Barnard, Inc. of Hauppauge, N.Y., and may be constructed as disclosed in U.S. Pat. No. 8,037,653, which is hereby incorporated herein by reference. Fastener 124 includes a smooth barrel or shaft 158 of approximately ⅜ inch diameter, a threaded end 160 (FIG. 1B) and a head 162. Head 162 includes a driver portion 170 configured as a hex head for driving fastener 124, as well as a collar 172. Collar 172 is mounted over shaft 158 and includes a pair of apertures 168 for receiving a tie member 125 for embedding within mortar of an outer wall system. Also included is a rigid washer 174 to which is applied a rubberized seal or layer 176 on the backside or underside of washer 174. Upon driving fastener 124 into a wall, collar 172 is held between washer 174 and driver portion 170, with seal 176 thereby pressed against washer 22. In the embodiment shown, seal 176 presses against the upper surface 34 of washer 22 about opening 42 to thereby seal the opening 42. In an alternative embodiment, a washer 22 may be provided having a differently sized bore 40 sized to receive washer 174 of fastener 124 whereby the seal 176 would contact or rest against seat 44 of cavity 38. Still further, if desired a seal ring, such as o-ring 56, may be utilized for receipt within cavity 38.

Figure 7A:
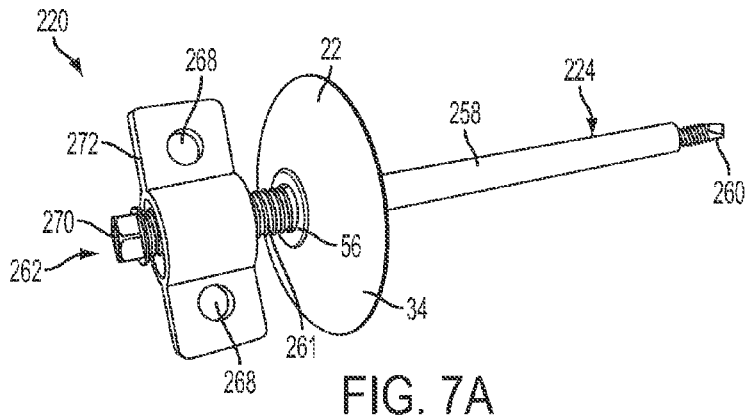
FIG. 7A is a perspective view of a washer and fastener according to an aspect of the present invention, where the fastener comprises an alternative brick-tie.
Figure 7B:
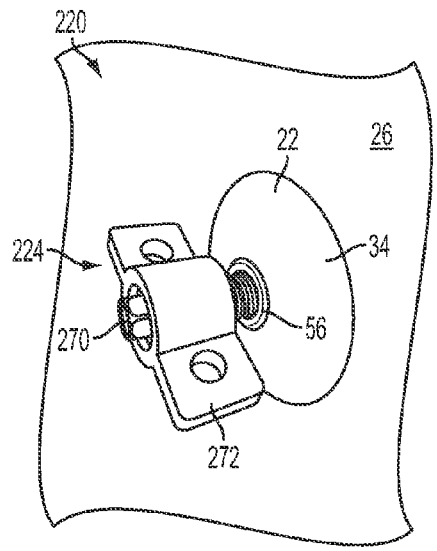
FIG. 7B discloses the washer and fastener of FIG. 7A shown mounted to a wall.
Figure 7C:
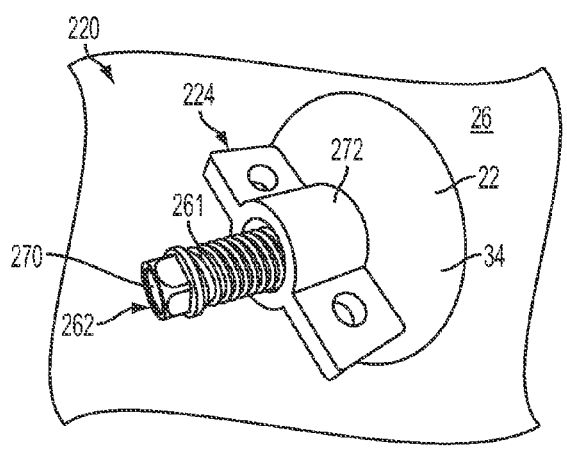
FIG. 7C discloses the washer and fastener of FIG. 7A with the fastener driven into the wall and the collar threaded down into engagement with the washer.

Referring now to FIGS. 7A-7C, combination 220 is shown to include washer 22 and fastener 224, where fastener 224 is provided by Heckman Building Products, Inc. Fastener 224 includes barrel shaft 258 of approximately ⅜ inch diameter, a threaded lower end 260, and head 262 having driver portion 270 formed as a hex head. Also included is collar 272 that is mounted on threaded portion 261 of shaft 258. Collar 272 includes apertures 268 for receiving tie members and internal threads for engaging with threaded portion 261. As understood from FIGS. 7B and 7C, upon driving fastener 224 into a wall 26 with washer 22 mounted on shaft 258, collar 272 is tightened against washer 22 with the underside of collar 272 thereby pressing against both seal ring 56 and the upper wall 34 of washer 22 about the opening 42 of cavity 38. Washer 22 and seal ring 56 thereby provide sealing both at the outer circumference of washer 22 relative to the wall to which it is mounted, as well as at the junction between the fastener 224 and washer 22 at aperture 36.

Figure 8A:
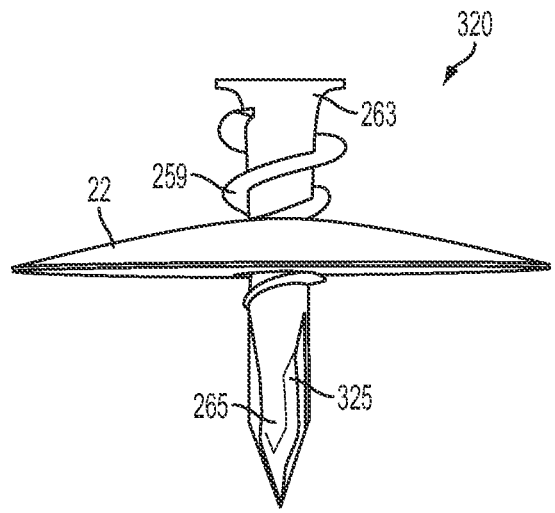
FIG. 8A discloses a washer and fastener according to another aspect of the present invention, where the fastener comprises an auger type screw.
Figure 8B:
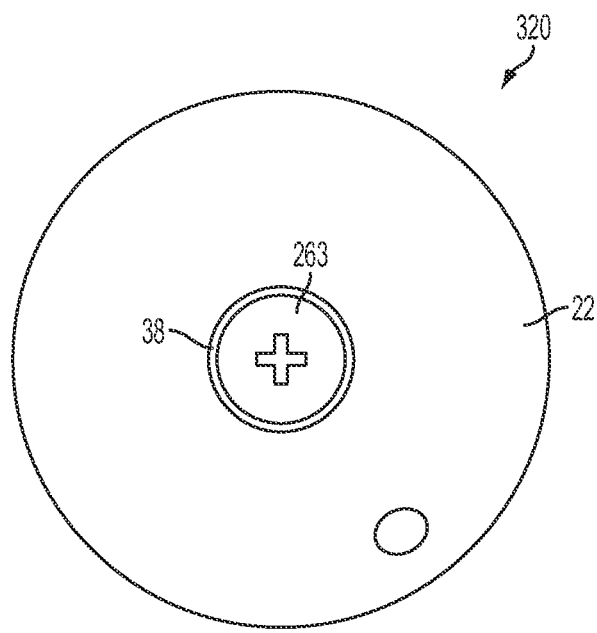
FIG. 8B discloses the washer and fastener of FIG. 8A mounted to a wall.

Referring now to FIGS. 8A and 8B, combination 320 is shown to include washer 22 and fastener 325. Fastener 325 comprises a conventional auger gypsum screw that may be made of plastic or metal and includes threads 259, head 263 and pointed end 265. In the embodiment shown, combination 320 does not disclose use of a seal ring 56. Upon installation, however, head 263 is recessed within cavity 38 whereby head 263 is fully disposed within the cavity 38. That is, head 263 does not extend out beyond the opening 42. Combination 320 may be used when applying a barrier sheet, such as sheet 32 of FIGS. 1A and 1B, over a building material. The use of washer 22 provides greater contact area or engagement with the barrier sheet, where without washer 22 the fastener 325 would pass through the barrier sheet and provide insufficient force to retain the barrier sheet. That is, the barrier sheet could be easily displaced from the head 263, such as by wind forces, as well as provide the opportunity for leak paths to be created at the fastener 325.

Figure 9:
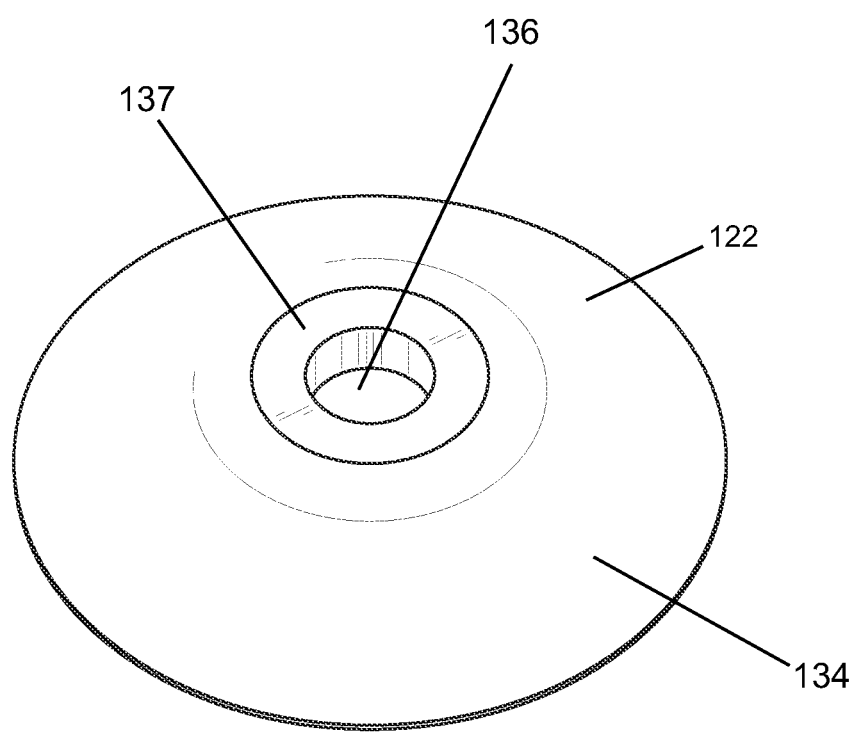
FIG. 9 discloses a perspective view of an alternative washer.
Figure 10:
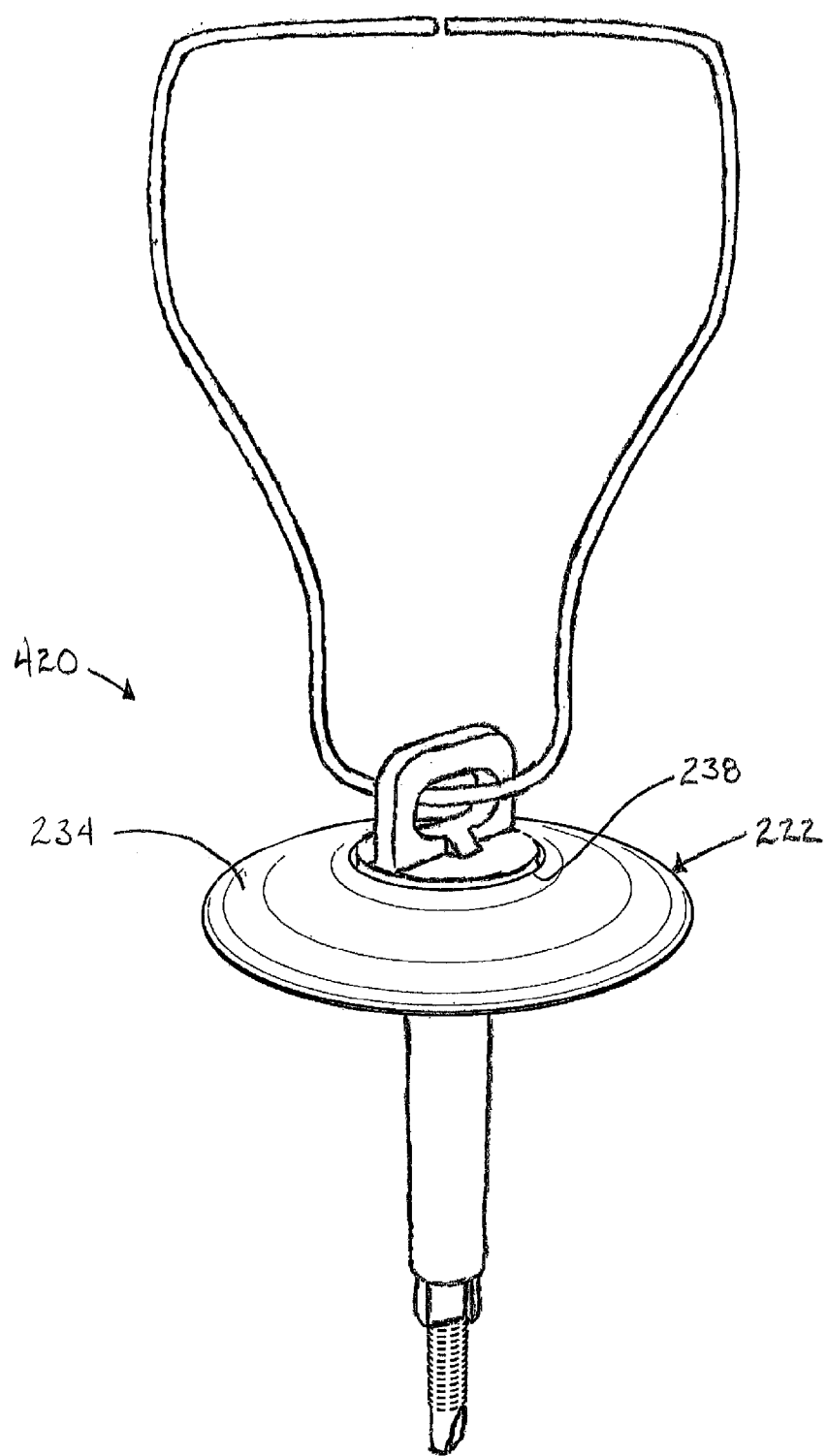
FIG. 10 is a perspective view of an alternative washer and brick-tie fastener according to an aspect of the present invention.
Figure 11:
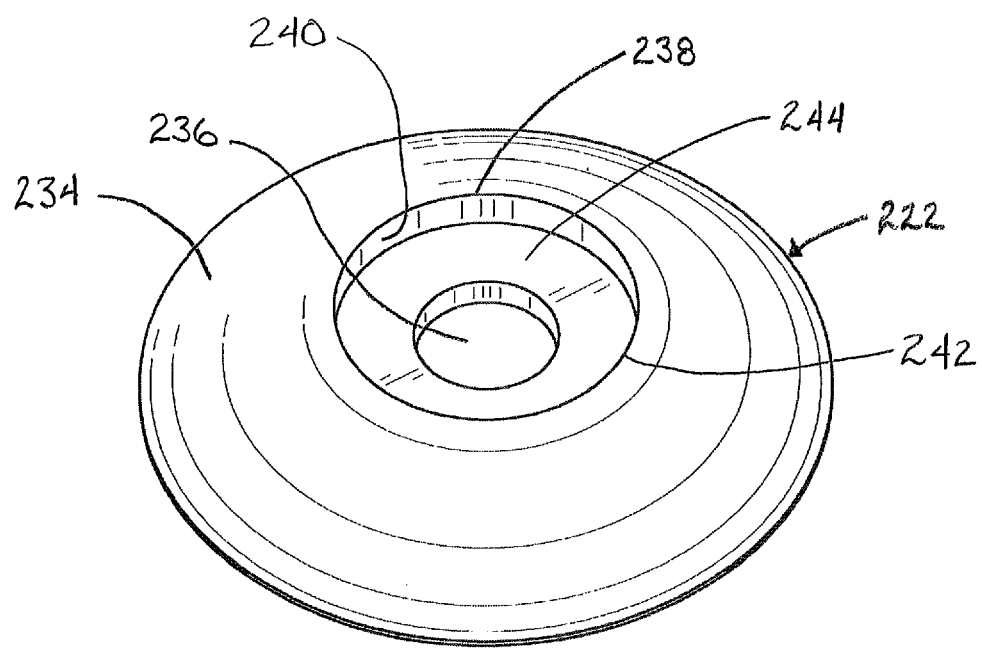
FIG. 11 is a top perspective view of the washer of FIG. 10 shown removed from the fastener.

An alternative washer that may be employed with fasteners 24, 124 or 224 is shown in FIG. 9 as washer 122. Washer 122 is generally similar to washer 22, but does not include a cavity 38 for receiving seal ring 56. It should also be appreciated that although shown and discussed in connection with fasteners 24, 124, and 224, that alternatively styled and/or sized fasteners, including fasteners provided by alternative suppliers, may be employed. As shown, washer 122 includes an outer surface or upper or outer wall 134, a central aperture 136 extending through washer 122, and may also include a flat portion 137 such as shown in FIG. 9. Washer 122 may, for example, be used with fastener 124 of FIGS. 6A and 6B whereby the seal 176 would be pressed against portion 137 of washer 122. The combination of fastener 124 and washer 122 may thereby be used to retain a barrier sheet and/or pliable building construction material, while operating to inhibit leakage between the barrier sheet or construction material and the underside of washer 122, as well as inhibit leakage past fastener 124 through central aperture 136.

Figure 12:
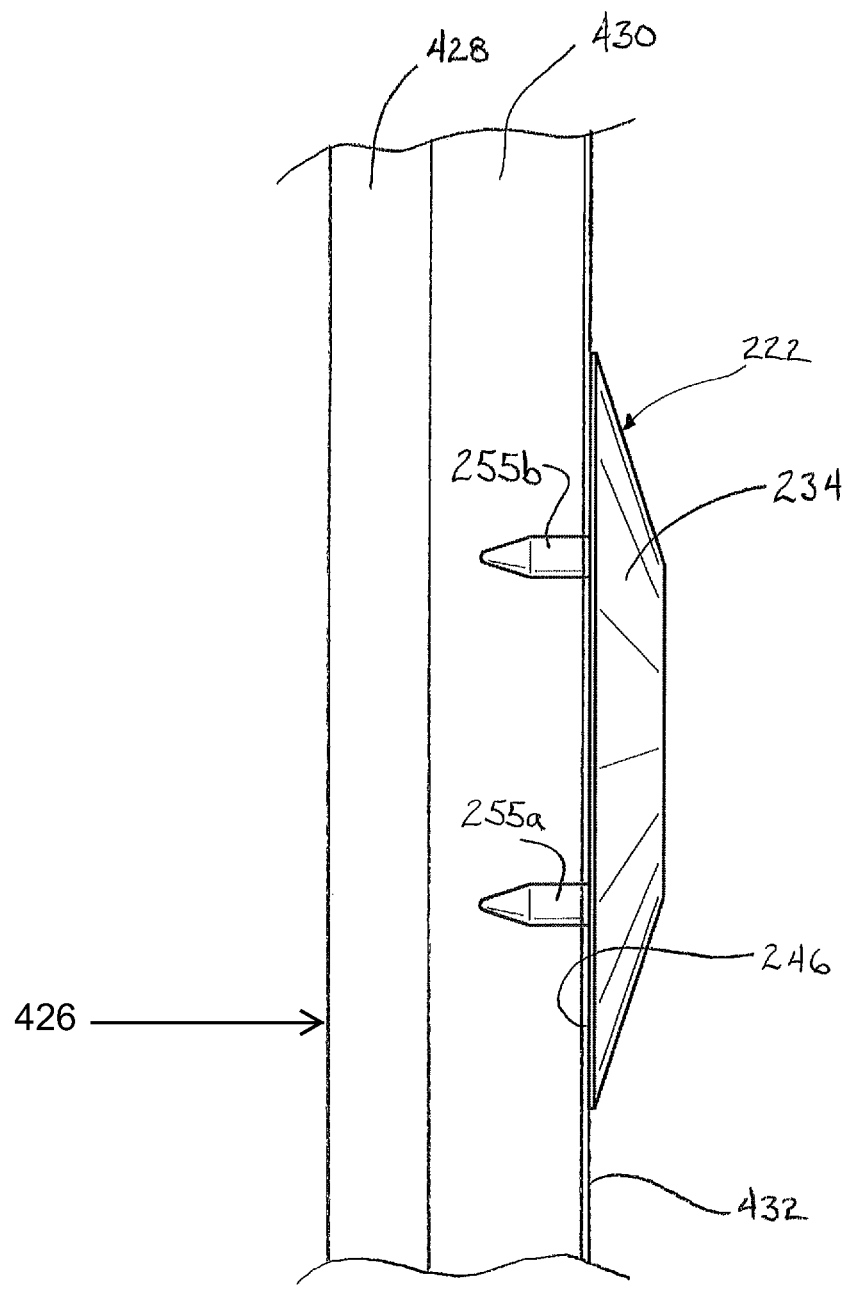
FIG. 12 is a side elevation view of the washer of FIG. 11.
Figure 13:
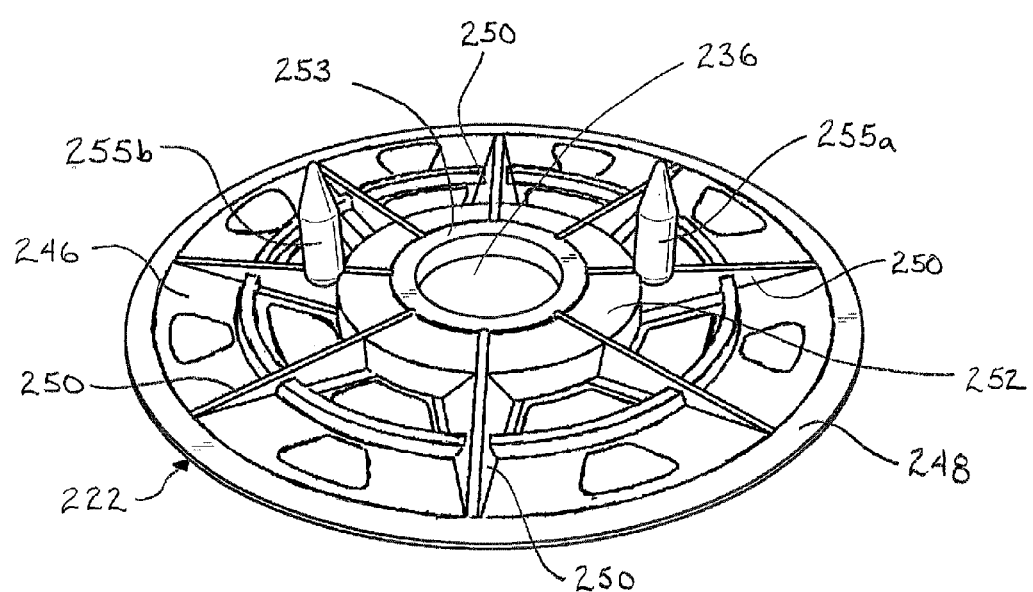
FIG. 13 is a bottom perspective view of the washer of FIG. 11.

Referring now to FIGS. 10-13, an alternative combination 420 is shown to include fastener 24 with washer 222. Washer 222 is generally similar to washer 22, but includes an alternatively sized cavity 138, as well as includes a pair of prongs or arms 255a, 255b extending or projecting from backside or underside 246 of washer 222. Prongs 255a, 255b may be pressed into a building material surface, such as foam insulation, to aid in retaining washer 22 in place during assembly of fastener 24 to the building. For example, as illustrated in FIG. 12, prongs 255a, 255b may be pressed through a barrier sheet 432 and into a foam insulation layer 430 to retain the barrier sheet 432 and/or washer 222 in place prior to or during affixing of fastener 24 to the rigid portion 428 of wall 426, where rigid portion 428 may comprise a metal stud for example.

As noted, washer 222 is generally similar to washer 22, with the similar components or features of washer 222 including similar reference numbers, but with 200 added thereto. Accordingly washer 222 is plastic and is shown to include a solid upper or outer surface or upper wall 234, a central aperture 236 extending through washer 222, and a recess or cavity 238 in outer surface 234. Cavity 238 includes a wall 240 formed as a cylindrical bore that forms an opening 242 in outer surface 234, where the cylindrical bore 240 has a diameter greater than aperture 236 and does not extend through washer 222 to thereby form a seat 244.

Washer 222 further includes an underside 246 having an outer circumferential sealing surface 248, a plurality of ribs 250, and a central bottom surface 252 disposed about aperture 236. Also included is an inner circumferential sealing surface 253. Underside 246 is generally concave, with outer surface 234 being correspondingly generally conical. The concavity of underside 246 is defined in part by the recessing of bottom surface 252 and sealing surface 253 relative to sealing surface 248. That is, sealing surface 253 is recessed away from a plane defined by sealing surface 248. Thus, for example with reference to FIG. 12, with washer 222 disposed against a wall 426 prior to a fastener 24 being fully tightened such that washer 222 is not flexed and sealing surface 248 is against sheet 32, sealing surface 253 would be slightly elevated from sheet 32. Upon tightening fastener 24, however, washer 222 may flex such that sealing surface 253 and/or bottom surface 252 contacts wall 426.

In the illustrated embodiment, washer 222 includes two projections or prongs or arms 255a, 255b that extend downwardly from the underside 246 of washer 222 by about approximately 0.25 inches. The arms 255a, 255b are diametrically opposed relative to each other and include angled tips 257a, 257b to form sharpened points for puncturing and/or penetrating building materials, such as a barrier sheet or a pliable construction material. The location of arms 255a, 255b within or between the outer sealing circumference 248 and inner sealing surface 253 aid in inhibiting moisture and/or air from reaching arms 255a, 255b. It should be appreciated that alternative arrangements of arms may be employed. For example, an alternative washer may be constructed to include a single arm or more than two arms, or alternatively spaced or shaped arms, although the use of two or more arms aids in preventing rotation of washer 222 upon installation. Still further, washers 122 may also be provided with one or more arms. Bore 240 defines a diameter of approximately 0.78 inches with a depth of approximately 0.08 inches to define seat 244. Accordingly seal ring 56 affixed to fastener 24 and flange 64 are able to be received within cavity 238 when fastener 24 is assembled to washer 222.

Figure 14:
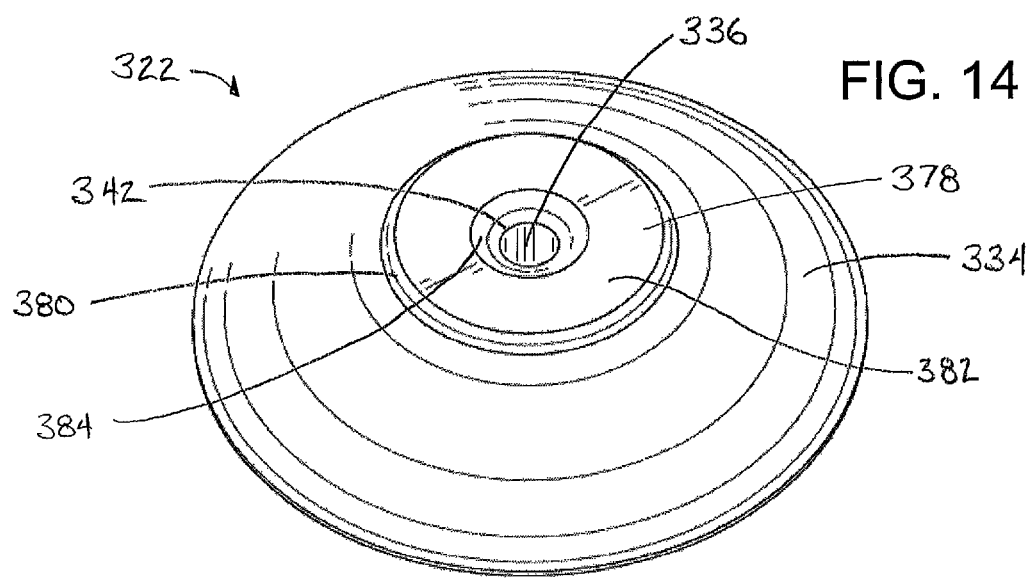
FIG. 14 is a top perspective view of an alternative washer according to an aspect of the present invention.
Figure 15:
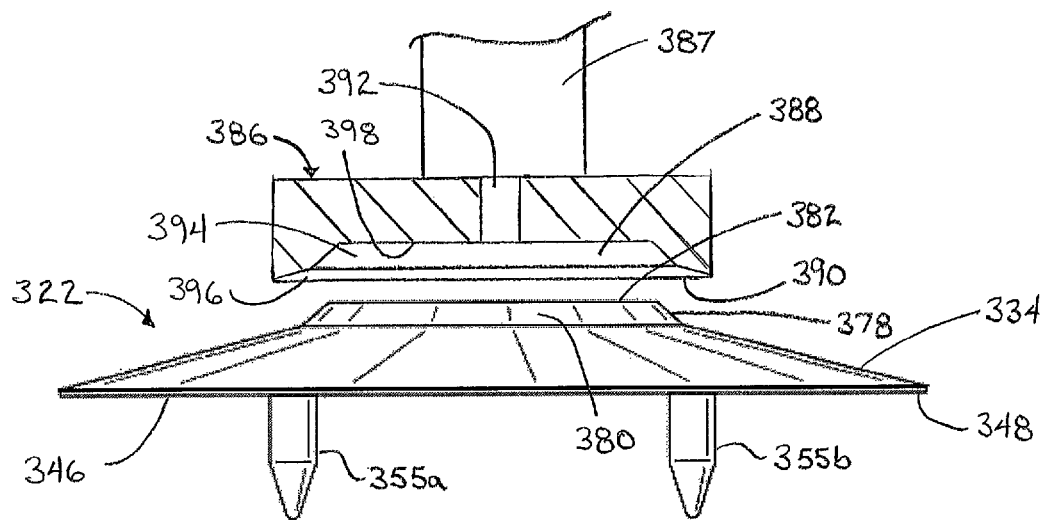
FIG. 15 is a side elevation view of the washer of FIG. 14 including a fastener gun adapter in cross section adapted for use in driving fasteners into the washer.

Referring now to FIGS. 14 and 15, still another alternative washer is shown identified generally by the reference numeral 322. Washer 322 shares components or features with washer 222, including a pair of arms or prongs 355a, 355b extending or projecting from backside or underside 346 of washer 322, as well as a central aperture 336 for receiving a fastener, such as a bugle head drywall screw, an outer circumferential sealing surface 348, and a solid outer surface or upper wall 334. The similar components or features of washer 322 relative to washer 222 are identified with similar reference numerals, but with 100 added thereto. However, not all of the similar features of washer 322 relative to washer 222 are discussed herein.

Washer 322 further includes an engagement portion or member, which in the illustrated embodiment comprises a protuberance or projection or protrusion member 378 on or extending from wall 334, where protrusion member 378 aids in locating a fastener gun assembly on washer 322 for aligning and driving a fastener through washer 322. In the illustrated embodiment, protrusion member 378 includes an angled wall portion 380 that, as understood from the side view of FIG. 15, defines a larger angle relative to wall 334 with respect to the central axis of washer 322 defined by central aperture 336, where angled wall portion 380 is upwardly angled relative to outer surface 334. Protrusion member 378 further includes a top surface 382 in which opening 342 of aperture 336 is formed. A chamfer 384 is also provided at opening 342, where chamfer 384 may receive the angled undersurface of a screw head, such as a bugle head style screw. Upon insertion of a bugle head screw into aperture 336, the angled undersurface of the screw head will mate or engage with the chamber 384 to thereby provide a seal against water, moisture and/or air passing through aperture 336. Thus, chamfer 384 comprises a sealing surface.

The inclusion of protrusion member 378 additionally creates a thicker central portion of washer 322 that has increased stiffness or rigidity. In contrast, the outer perimeter or surrounding portion of washer 322 defined by upper wall 322 that surrounds the central portion of washer 322 defined by protrusion member 378 is more flexible relative to protrusion member 378. Thus, when assembled, the surrounding outer portion is able to flex for improved sealing as discussed above in connection with FIGS. 1A and 1B.

As noted, protrusion member 378 may be used for locating or positioning a fastener gun 400 (FIG. 1) assembly relative to washer 322 whereby a fastener 401, such as a threaded screw, may be driven into aperture 336. An alignment tool or adapter 386 is shown in partial cross section in FIG. 15, where adapter 386 may be configured for affixing to any of a number of fastener guns via arm 387 in similar manner to that disclosed in U.S. Pat. No. 8,413,740, which is incorporated by reference in its entirety. Adapter 386 includes an arm 386 for connecting adapter 386 with fastener gun 400. Adapter 386 also includes a receptacle 388 in end 390 that is configured to receive or mate with protrusion member 378 whereby a fastener 401 driven by the fastener gun 400 to which adapter 386 is affixed will be driven through aperture or hole 392 in adapter 386, which is aligned with the fastener driven by the fastener gun, and into aperture 336 of washer 322. Protrusion member 378 thus aids in aligning the fastener gun, and specifically the fastener driven from the gun, with aperture 336 of washer 322. Although fastener gun 400 is shown as an auto feed screw gun for driving fasteners 401 comprising threaded fasteners, it should be appreciated that alternative fastener guns and associated fasteners may be employed, such as fastener guns for nails, pins and the like.

Figure 15A:
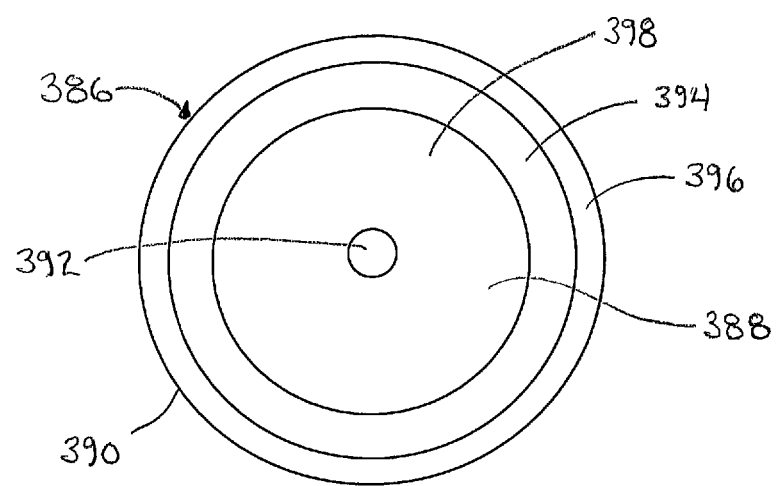
FIG. 15A is an end view of the adapter of FIG. 15.

With further reference to FIGS. 15 and 15A, in the illustrated embodiment, adapter 386 includes a first mating surface 394 and a second mating surface 396 that engage with washer 322. Mating surface 394 defines an angle adapted to mate with the angle of angled wall 380 of protrusion 378 and mating surface 396 defines an angle adapted to mate with the angle of outer wall 334 of washer 322. Thus, when adapter 386 is placed over protrusion 378 of washer 322, mating surfaces 394, 396 contact walls 380, 334, respectively, for alignment or centering of hole 392 of adapter 386 with aperture 336 of washer 322. However, washer 322 is not physically retained within receptacle 388. It should thus be understood that receptacle 388 has a depth relative to end 390 sufficient such that top surface 382 does not contact base wall 398 of receptacle 388. As understood from FIG. 15A, adapter 386 is circular and mating surfaces 394, 396 define circumferential walls that engage with washer 322 within the outer periphery of the washer 322 in the embodiment shown. In an alternative embodiment, however, mating surfaces 394, 396 need not extend fully about receptacle 388.

In use, multiple washers 322 may be initially affixed to building materials, such as by way of pressing prongs 355a, 355b through a barrier sheet and into a foam material. Washers 322 will thus be maintained in place prior to receiving a fastener and without needing to be held by hand. An operator utilizing a fastener gun to which adapter 386 is mounted is then able to subsequently readily align the fastener gun with the washer 322 by way of the mating engagement of adapter 386 with protrusion member 378, and is then able to drive a fastener into washer 322 such that washer 322 is secured to the building, such as to a rigid substrate.

Figure 15B:
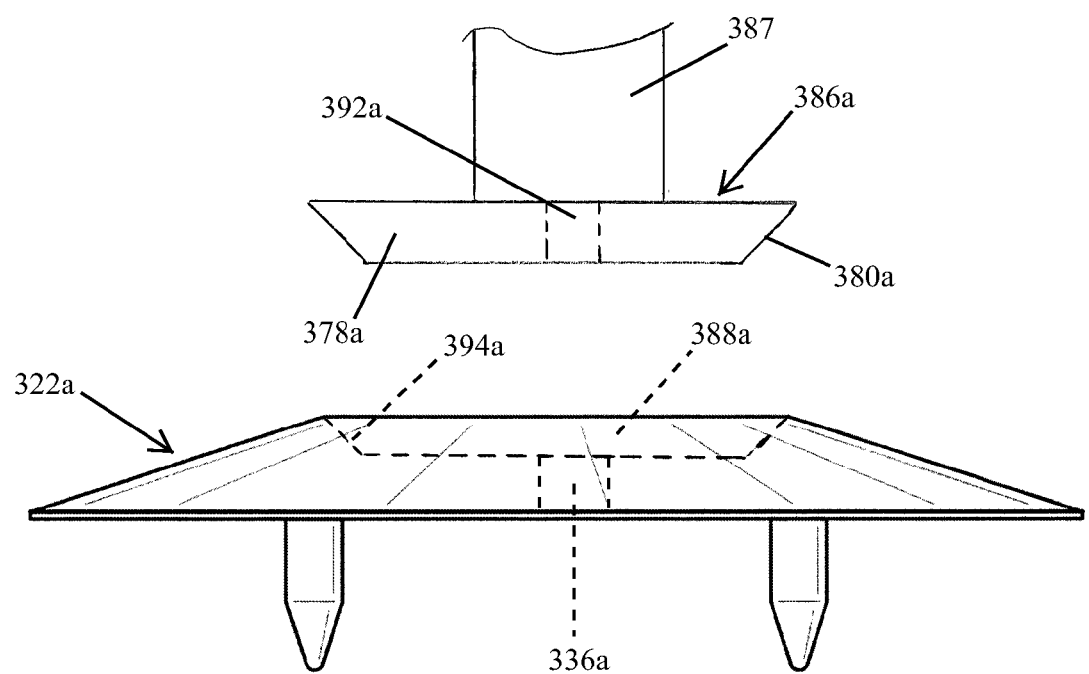
FIG. 15B is a side elevation of an alternative washer and fastener gun adapter.
Figure 16:
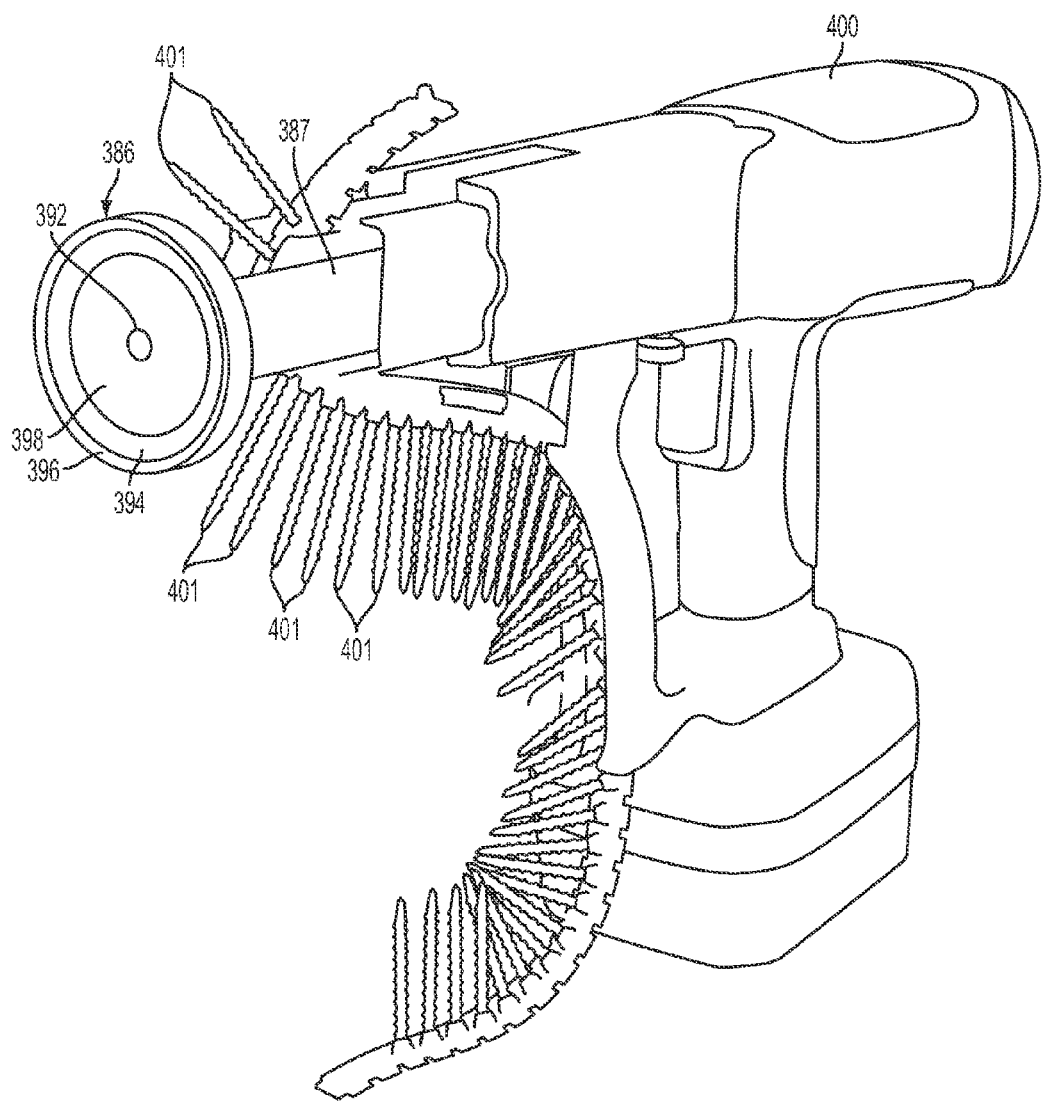
FIG. 16 is a perspective view of a fastener gun device to which is mounted the adapter of FIGS. 15 and 15A.

Although the engagement member of the illustrated embodiment is shown as an extending protrusion member 378 having a generally plateau configuration that is received within the receptacle 388 of adapter 386, it should be appreciated that alternative engagement members and/or adapter receptacle configurations may be employed. For example, as shown in FIG. 15B a washer 322a may be formed to include an engagement portion or member formed as receptacle 388a with the adapter 386a including or comprising an extension or projecting engagement member 378a that engages within washer 322a. In particular, adapter 386a includes an angled circumferential wall 380a that engages with the interior angled circumferential wall 394a of washer 322a for aligning or centering the aperture 392a of adapter 386a with the aperture 336a of washer 322a.

In use, one or more washers 322 are affixed to a barrier sheet and/or a penetrable or soft construction material of an inner wall in desired locations by pressing the prongs 255a, 255b into the barrier sheet and/or construction material. The prongs 255a, 255b thereby retain the washer 322 in place. Subsequently, an operator utilizing fastener gun 400 with adapter 386 affixed thereto is able to readily drive fasteners 401 into the inner wall assembly through washer 322 by locating the adapter 386 on the engagement member 378 such that the screw 401 is accurately centered with the aperture 336 in washer 322.

In the illustrated embodiment washer 322 does not include a cavity and seat for receiving the head of a brick tie fastener. However, washer 322 may alternatively be provided with such a cavity and a seat in like manner to washer 222 for applications requiring brick tie fasteners. Likewise, washer 222 may be formed to not include cavity 238 and seat 244, but rather be configured to include an aperture 336, opening 342 and chamfer 384 in similar manner to washer 322. Washer 322 also includes ribs, an inner sealing and the like as illustrated in connection with washer 222. Still further, although shown with prongs 255a, 255b, washer 322 may alternatively be formed to include fewer or more prongs, or alternatively arranged prongs, or may even be formed without prongs.

Although inner wall 26 is shown in the illustrated embodiment as comprising a barrier sheet 32 disposed over a deformable construction material 30 and, in turn, a rigid member 28, it should be appreciated that the present invention is useable with alternative wall assemblies. For example, the fastener and washer combinations discussed above may be utilized in a system that does not include a barrier sheet or a pliable construction material.

The washer and fastener combinations enable soft or pliable building materials, such as barrier sheets and insulation, to be rapidly, accurately and safely mounted to buildings. The washers via the prongs can be pre-spotted by hand to a vertical building surface by being pressed therein. Subsequently, via the use of a self-centering tool affixed to a fastener gun, screws or other types of fasteners, can be rapidly and accurately driven through the washers. The washers provide increased safety because the washers may be placed on the building material, and be self-retained via the prongs in particular embodiments, such that an operator or construction worker does not have to place their hand in front of the fastener gun to hold or insert the washer. Still further, the inclusion of sealing surfaces on the underside of the washer, and the inclusion of a sealing surface in the form of a chamfer about the aperture in the top side of the washer, inhibits water, moisture and/or air from getting past the undersurface of the washer or into the aperture and to the point at which the fastener penetrates the building materials.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A washer for use in building construction, said washer comprising:
   an outer side having a solid upper surface defined by an upper wall, an underside opposite said outer side, and a perimeter;
   an aperture extending from said outer side to said underside; and
   an engagement portion configured to be a projection member, wherein said projection member extends upward from said upper surface, said engagement portion configured for mating with an adapter of a fastener gun for locating the fastener gun relative to said aperture
   wherein said upper surface of said outer side comprises a conical portion from said perimeter to said engagement portion with said conical portion defining a continuous inclined surface from said perimeter to said engagement portion with said conical portion configured for mating with the adapter of the fastener gun for locating the fastener gun relative to said aperture.

2. The washer of claim 1, further including a prong member projecting from said underside.

3. The washer of claim 2, wherein said prong member is disposed radially inward from said perimeter.

4. The washer of claim 3, wherein said underside includes an outer sealing surface adjacent to and disposed about said perimeter and wherein said prong member is disposed radially inward from said outer sealing surface.

5. The washer of claim 4, wherein said underside includes an inner sealing surface disposed about an opening in said underside formed by said aperture, and wherein said prong member is disposed radially between said outer sealing surface and said inner sealing surface.

6. The washer of claim 5, wherein a chamfer is disposed about said aperture at said outer side, said chamfer configured to provide a seal when engaged by a screw head of a screw used to affix said washer to a building.

7. The washer of claim 2, further including a pair of prong members projecting from said underside.

8. The washer of claim 1, wherein said engagement portion comprises a projection member having a wall portion that is upwardly angled relative to said upper wall.

9. The washer of claim 8, wherein said wall portion of said projection member comprises a circumferential wall.

10. The washer of claim 9, wherein said projection member includes a generally planar top surface with said aperture forming an opening in said top surface.

11. The washer of claim 8, further including a prong member projecting downward from said underside with said prong member being disposed radially inward from said perimeter.

12. A washer and mating adapter for a fastener gun system, said system comprising:
   an adapter for attaching to a fastener gun, said adapter including an adapter aperture through which fasteners may be discharged by the fastener gun; and
   a plurality of washers separate from and not retained by said adapter or the fastener gun, each said washer comprising an outer side having a solid upper surface defined by an upper wall, an underside opposite said outer side, and a perimeter, each said washer further including a washer aperture extending from said outer side to said underside, and an engagement portion configured to be at least one of a projection member or a receptacle in said outer side located inward of said perimeter, wherein said projection member extends upward from said upper surface and said receptacle extends inward from said upper surface, wherein said upper surface of said outer side of said washers comprises a conical portion from said perimeter to said engagement portion, and with each said washer further including a prong member projecting from said underside, said adapter configured for mating engagement with said engagement portion of each said washer for locating the adapter aperture relative to said corresponding washer aperture.

13. The system of claim 12, wherein said underside of said washers include an outer sealing surface adjacent to and disposed about said perimeter and wherein said prong member is disposed radially inward from said perimeter.

14. The system of claim 13, wherein said underside includes an inner sealing surface disposed about an opening in said underside formed by said washer aperture, and wherein said prong member is disposed radially between said outer sealing surface and said inner sealing surface.

15. The system of claim 13, further including a pair of prong members projecting from said underside.

16. The system of claim 12, wherein said engagement portion comprises a projection member having a wall portion that is upwardly angled relative to said upper wall, and wherein said adapter includes a receptacle, said receptacle including a correspondingly angled inner wall that mates with said wall portion of said projection member with said receptacle thereby conforming with said projection member, and wherein said adapter includes an arm that is removably attachable to the fastener gun.

17. The system of claim 16, wherein said conical portion defines a continuous inclined surface from said perimeter to said engagement portion, and wherein said adapter is configured to contact said conical portion for locating the fastener gun relative to said washer aperture.

18. The system of claim 12, wherein said conical portion defines a continuous inclined surface from said perimeter to said engagement portion.

19. A method of affixing a washer to a building wall, said method comprising:

providing a washer separate from a fastener gun, said washer comprising an outer side having a solid upper surface defined by an upper wall, an underside opposite said outer side, a perimeter, an outer sealing surface adjacent to and disposed about said perimeter, a washer aperture extending from said outer side to said underside, an engagement portion configured to be at least one of a projection member or a receptacle in said outer side located inward of said perimeter, wherein said projection member extends upward from said upper surface and said receptacle extends inward from said upper surface, and further comprising a prong member projecting from said underside and disposed radially inward from said outer sealing surface, providing an adapter affixed to a fastener gun, said adapter including an adapter and an adapter surface for mating with said engagement portion of said washer;

said method further comprising sequentially:

(1) pressing said prong of said washer into a soft building material of the building wall whereby said washer is self-retained on the soft building material;

(2) engaging said adapter surface of said adapter with said engagement portion of said washer after pressing said prong of said washer into the soft building material, wherein when said adapter surface of said adapter is engaged with said engagement portion said washer aperture and said adapter aperture are axially aligned; and (3) driving a fastener from the fastener gun into the washer aperture with the fastener fixedly holding said washer to the building wall.

20. The method of claim 19, wherein said engagement portion of said washer comprises a projection member having a wall portion that is upwardly angled relative to said upper wall, and wherein said adapter includes a receptacle, and wherein said receptacle includes said adapter surface with said adapter surface comprising an angled inner wall that mates with said wall portion of said projection member.

21. The method of claim 19, wherein said washer comprises a plurality of prongs projecting from said underside.

* * * * *